Oct. 12, 1937.  J. DI MARINO  2,095,323
MUSHROOM HOUSE CONSTRUCTION
Filed Feb. 23, 1937  2 Sheets-Sheet 1
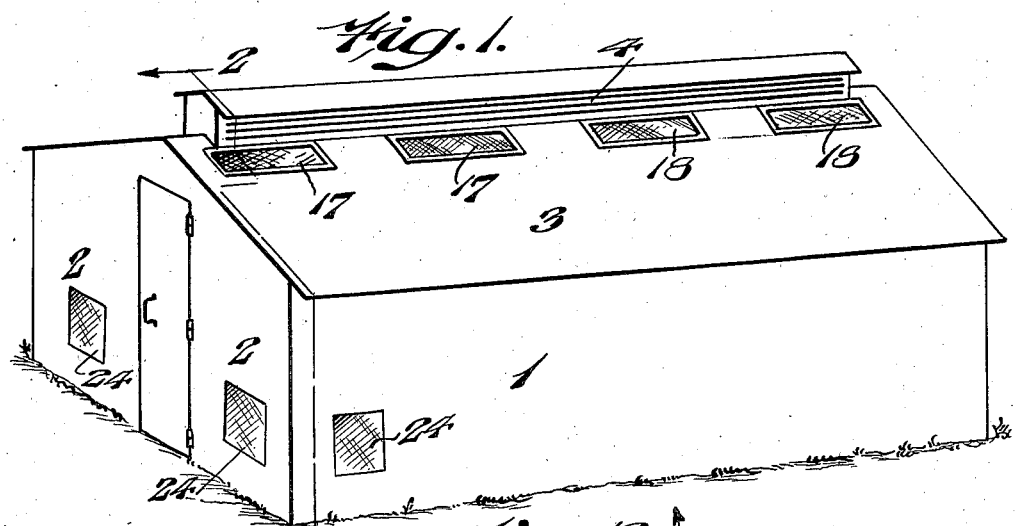
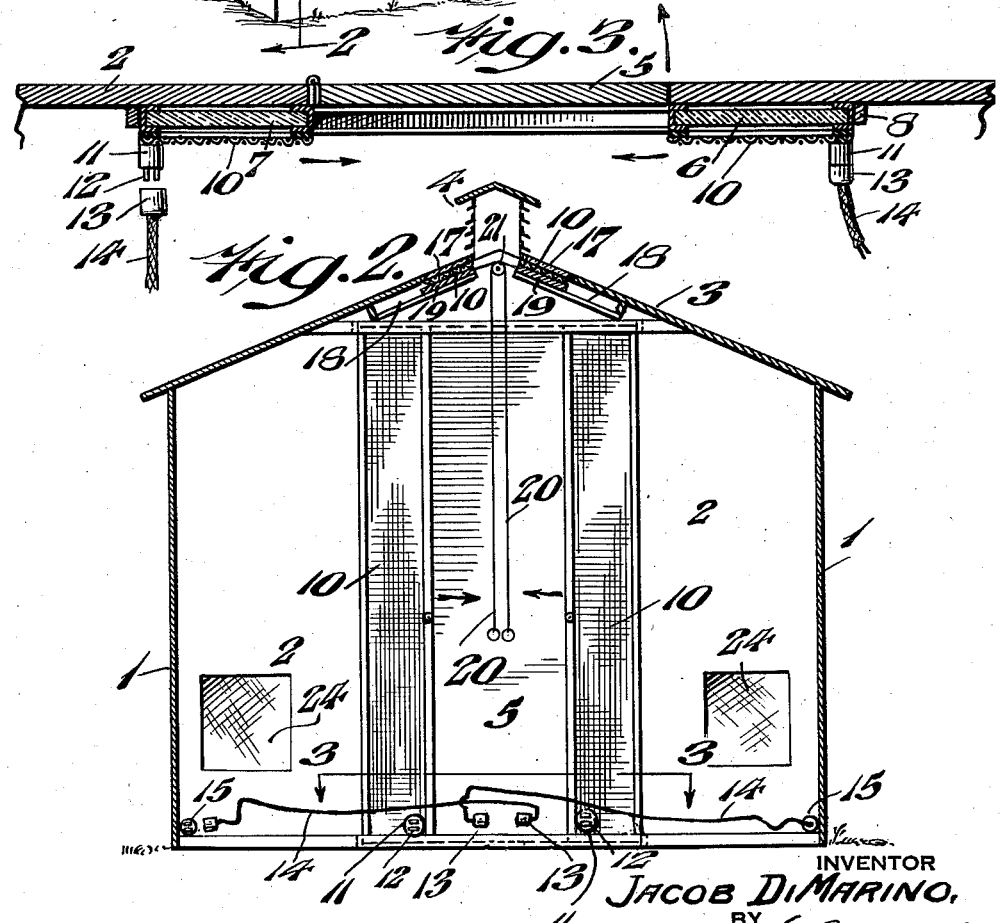
INVENTOR
JACOB DiMARINO,
BY
Louis Nechs
ATTORNEY

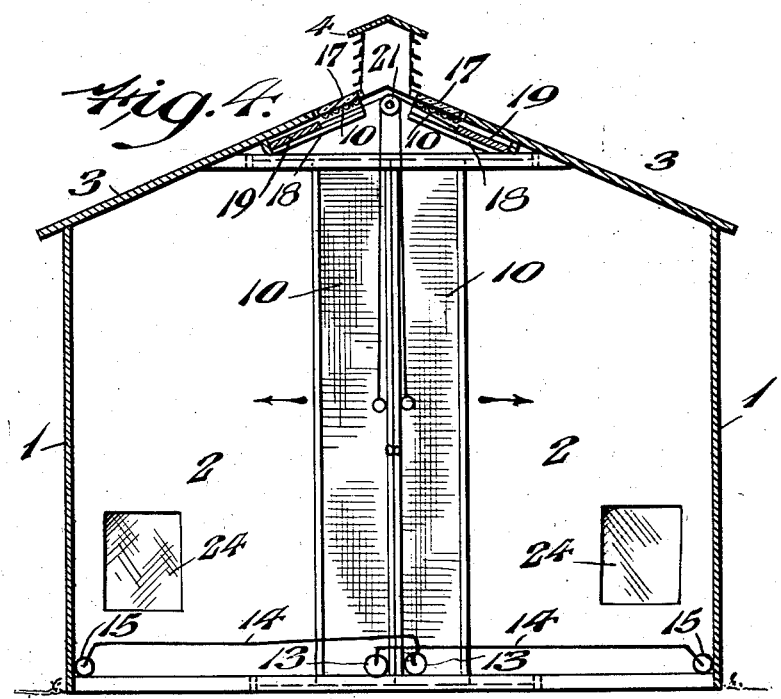
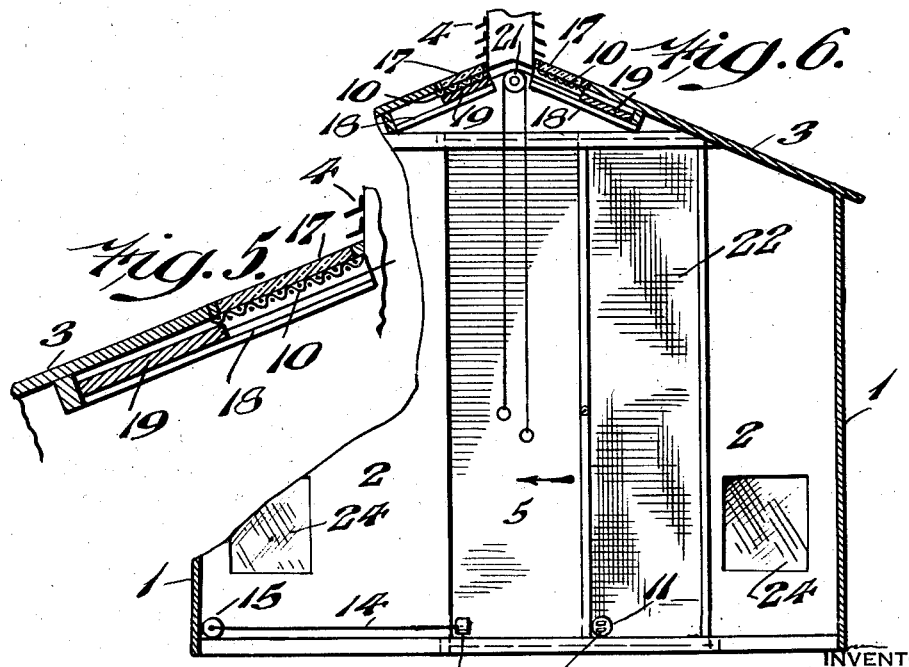

Patented Oct. 12, 1937

2,095,323

UNITED STATES PATENT OFFICE 2,095,323

MUSHROOM HOUSE CONSTRUCTION

Jacob Di Marino, Toughkenamon, Pa.

Application February 23, 1937, Serial No. 127,083

4 Claims. (Cl. 47—17)

My invention relates to a new and useful mushroom house construction of the type usually employed for the growing of mushrooms, such houses being generally constructed of a relatively large, elongated structure with a relatively high ceiling, and enclosing tiers of mushroom beds extending lengthwise of the house with an aisle in between, and a ventilator at the peak of the roof.

Due to the necessity of accurately controlling the temperature, ventilation and humidity, such houses are usually built without any windows and with a door on one or both of the opposite ends of the house thus necessitating the use of artificial lighting, electric or otherwise. Mushroom workers sometimes do not see sunlight during the entire working week due to the fact that the door through which they enter the house and which has heretofore been made of solid wood must be kept closed in order not to interfere with the established atmospheric conditions. This is highly detrimental to the physique and morale of the workers.

Furthermore, in the humus, manure, or other prepared compost, which is used for growing mushrooms there are great numbers of insect eggs or larvae which hatch in the favorable atmosphere of the mushroom house and constitute a distinct menace to the growing mushrooms which are very delicate and extremely subject to infection. In the darkness of a closed mushroom house it has been heretofore impossible adequately to exterminate these insects.

It is therefore the object of my invention to provide a mushroom house in which the worker is afforded a measure of daylight, thus facilitating work and reducing lighting expense, and it is a further object of my invention to provide means for effectively, conveniently and inexpensively exterminating the insects.

In the accompanying drawings:

Fig. 1 represents a perspective view of a mushroom house embodying my invention.

Fig. 2 represents a section on line 2—2 of Fig. 1.

Fig. 3 represents a section on line 3—3 of Fig. 2.

Fig. 4 represents a view similar to Fig. 2 with the glass door shut.

Fig. 5 represents, on an enlarged scale, a fragmentary sectional view showing details of construction.

Fig. 6 represents a view similar to Fig. 2 showing a modified form of construction.

Referring to the drawings in which like reference characters represent like parts, the mushroom house is composed of the sides 1, ends 2 and the peaked or slanting roof 3, which are of any desired conventional construction. 4 designates the usual ventilator employed in conventional mushroom houses.

In order to admit daylight, and in order to provide means for extermination of the insects incubating within the house, I provide, inside of the conventional wooden door 5, a secondary or inner door which, as shown in Figs. 1 to 3, is composed of the sections 6 and 7 sliding in suitable frames 8 and which can be drawn together in the direction of the arrows in Fig. 3 to close the opening left when the door 5 is ajar. Carried by a suitable frame and disposed close to the inside surface of the glass door sections 6 and 7 are the wire-mesh screens 10 and the electric sockets 11 of the type having projecting prongs 12. 13 designates a socket adapted to fit over the prongs 12 and communicating through the wire 14 with a source of electrical energy 15, whereby the screen sections 10 may be electrified after the glass sections 6 and 7 are drawn together to close the opening of the door 5.

When the outer solid wooden door 5 is opened, the worker enters and slides together behind him the glass shutters 6 and 7 and then plugs in the sockets 13 to electrify the wire screen 10. It is well known that insects confined in a dark place will immediately flock towards a ray of light and, in this instance, the light showing through the glass shutters 6 and 7 attracts the insects which, in their flight towards a light, alight upon or impinge against the electric wire screen and are electrocuted. The light shed through the glass shutters 6 and 7 serves to illuminate the inside of the mushroom house thus dispensing with the costs of artificial lighting and making the working conditions more sanitary and cheerful. Independently from and used with, or as an exclusive substitute for the sliding glass doors 6 and 7, may be employed, the construction illustrated in Figs. 1 to 5 and comprising the interspaced glass windows 17 which are preferably placed along side the ventilator 4 so that they may register with the aisle usually provided between the tiers of the mushroom beds so that the light shed through these windows may be adequately diffused throughout the house instead of being concentrated on particular spots only. As will be seen from Figs. 4 and 5, the windows 17 are permanently in the roof and under them is provided the frame 18 in which slide the wooden shutters 19, said wooden shutters being attached to the ropes 20, passing over pulleys 21 so that, when it is desired to shut out the light, the shutters 19 are brought up to register with the windows 17 by pulling on the cords 20 the other ends of which can be fastened to suitable points to retain the wooden shutters 19 in their upper closing position. If it is desired to shed light through the windows 17, the cords 20 are loosened from their point of attachment and the shutters 19 slide back by the force of gravity out of registration with the windows 17 as best illustrated in Figs. 4 and 6. The glass windows 17 are also provided with screens 10 which, in this instance, are preferably permanently wired for electrification, the control of the flow of current being effected by a switch accessible from the floor of the mushroom house. In Fig. 6 the construction is identical with that shown in Figs. 1 and 3 except that in lieu of forming the inner glass door of two sections 6 and 7 slidable towards each other, the door is formed of a single piece of glass 22 which is provided with the inner electrified screen 10 electrified by the plugs 13.

The reason for employing the plugs 13 and the wires 14 is to enable me so to allocate the sockets 11 as to prevent opening of the glass door before the plugs 13 are disconnected thus guarding against the possibility of forgetting the screens in their electrified condition when the worker leaves the mushroom house. To this end, as will be seen from Fig. 2, the right hand plug 13 is attached to the left hand section 7, whereas the left hand plug 13 is attached to the right hand section 6 so that, if it is attempted to slide the section 6 from its closing to its open position, the length of cord 14 will prevent this movement until the plugs are detached. Similarly, as will be seen from Fig. 6, the plug 13 is applied to the left hand edge of the sliding closing door 22 so that the plug must be detached before the door 22 can be slid in the opposite direction into its out-of-the-way position. By this means I insure against forgetfulness which may result in accident or in undue consumption of current. While I have shown this preferred means of accomplishing this result, I am aware that an ordinary switch such as that used for supplying electric current for ordinary electric fixtures could be used with or without the accompaniment of a small red light that will burn when the current is on and that will extinguish when the current is turned off to indicate whether or not the screens 10 are charged.

If desired additional windows 24, or of the type that can be opened and shut with or without the screens 10, may be provided at strategic positions. I have illustrated two such windows but I want it understood that they may be positioned at any desired point. With respect to the screen 10 I have not shown the exact weaving of the screen for the reason that electric screens of the character referred to are well known and available.

Having thus described my invention, what I claim as new and desire to secure by Letters Patent is:

1. A mushroom house having an opening in a wall thereof, and an opaque shutter carried by said wall for closing said opening, in combination with a light-transmitting shutter carried by said wall normally out of registration with said opening and adapted to be brought into registration to close said opening when said opaque shutter has been removed from registration with said opening, a screen carried by the inner surface of said light-transmitting shutter, and means for charging said screen with electrical energy.

2. A mushroom house having an opening in a wall thereof, and an opaque shutter carried by said wall for closing said opening, in combination with a light-transmitting shutter carried by said wall normally out of registration with said opening and adapted to be brought into registration to close said opening when said opaque shutter has been removed from registration with said opening, a screen carried by the inner surface of said light-transmitting shutter, and means for charging said screen with electrical energy only when said light-transmitting shutter is in registration with said opening.

3. A mushroom house having an opening in a wall thereof, and a sliding opaque shutter carried by said wall for closing said opening, in combination with a sliding light-transmitting shutter carried by said wall normally out of registration with said opening and adapted to be brought into registration to close said opening when said sliding opaque shutter has been removed from registration with said opening, a screen carried by the inner surface of said sliding light-transmitting shutter, and means for charging said screen with electrical energy.

4. A mushroom house having a light-transmitting portion embedded in the ceiling thereof, a guide frame adjacent said light-transmitting portion, an opaque shutter adapted to slide in said guide frame and normally maintained out of registration with said light-transmitting portion by gravity, means for actuating said opaque shutter to bring it into registration with said light-transmitting portion, and an electrically charged screen carried by the underside of said light-transmitting portion.

JACOB DI MARINO.